(12) United States Patent    (10) Patent No.: US 7,240,035 B1
Engstrom    (45) Date of Patent: Jul. 3, 2007

(54) METHOD AND APPARATUS FOR MASKING PRIVATE MAILING ADDRESS INFORMATION BY MANIPULATING DELIVERY TRANSACTIONS

(75) Inventor: G. Eric Engstrom, Kirkland, WA (US)

(73) Assignee: Hall Aluminum LLC, Los Altos, CA (US)

( * ) Notice: Subject to any disclaimer, the term of this patent is extended or adjusted under 35 U.S.C. 154(b) by 565 days.

(21) Appl. No.: 09/872,293

(22) Filed: May 31, 2001

(51) Int. Cl.
*G06Q 40/00* (2006.01)
*G06Q 99/00* (2006.01)
*H04K 1/00* (2006.01)
*H04L 9/00* (2006.01)

(52) U.S. Cl. .............................. 705/74; 705/26; 705/27

(58) Field of Classification Search ................ 705/26, 705/27, 28, 29, 74
See application file for complete search history.

(56) References Cited

U.S. PATENT DOCUMENTS

| | | | |
|---|---|---|---|
| 6,336,100 B1 * | 1/2002 | Yamada ...................... | 705/26 |
| 2001/0029496 A1 * | 10/2001 | Otto et al. .................... | 705/74 |
| 2001/0044785 A1 * | 11/2001 | Stolfo et al. .................. | 705/74 |
| 2002/0013739 A1 * | 1/2002 | O'Donnell et al. ........... | 705/26 |
| 2002/0022967 A1 * | 2/2002 | Ohkado ......................... | 705/1 |
| 2003/0208411 A1 * | 11/2003 | Estes et al. ................... | 705/26 |
| 2004/0254893 A1 * | 12/2004 | Tsuei et al. ................... | 705/74 |

FOREIGN PATENT DOCUMENTS

| | | | |
|---|---|---|---|
| EP | 1 150 227 A2 * | 6/2000 | |
| WO | WO/ 0014648 | * | 3/2000 |
| WO | WO 01/69914 | * | 9/2001 |
| WO | WO 01/69914 A2 * | 9/2001 | |

OTHER PUBLICATIONS

"DeskGate Technologies and eCharge Corporation Join Forces to Bring Easy, Anonymous E-Commerce to Digital Publication and Music Purchasers"; PR Newswire, Oct. 26, 1998. p. 1.*

* cited by examiner

*Primary Examiner*—F. Ryan Zeender
(74) *Attorney, Agent, or Firm*—Schwabe, Williamson & Wyatt, P.C.

(57) ABSTRACT

An online purchaser subscribes for substitute delivery address service with a delivery address service. The online purchaser provides the delivery address service with his/her mailing address. As part of the subscription service, the delivery address service provides the online purchaser with one or more substitute delivery addresses for use to engage in online purchase transaction. As a result, online businesses from which the online purchaser purchases goods attempt to deliver the purchases goods to the purchaser at the substitute delivery address or addresses. The delivery address service facilitates redirection and delivery of the purchased goods to the purchaser, thereby protecting the privacy of the purchaser's mailing address. In an alternate embodiment, the beneficiary may be another subscriber designated as recipient by the purchaser.

28 Claims, 5 Drawing Sheets

METHOD AND APPARATUS FOR MASKING PRIVATE MAILING ADDRESS INFORMATION BY MANIPULATING DELIVERY TRANSACTIONS

FIELD OF THE INVENTION

The present invention relates to the field of online commerce services. More specifically, the present invention relates to methods and apparatuses for delivering online purchased goods or merchandises, while maintaining private the mailing addresses of the purchaser or the designated recipient of the purchased goods.

BACKGROUND OF THE INVENTION

The Internet is a well-known collection of public and private data communication and multimedia networks that operate using common communication protocols to form a world wide network of networks. Recently there has been an explosion in the availability of "virtual storefronts," e.g., online commerce sites, reachable over the Internet. This rapid growth is due, in part, to the availability of fast, reliable and affordable computing devices and the general simplification of networking hardware and configuration. Thus, consumers and businesses alike now have access to hardware that makes effective online commerce commercially practicable.

To facilitate conduct of online transactions with their customers, a business typically sets up an e-commerce web site, and makes it accessible to online customers, as part of the World Wide Web (which is a logical overlay of the Internet). Each web site typically includes a number of web pages, developed using programming languages such as Hypertext Markup Language (HTML). The web pages are typically augmented with client side applets, developed using programming languages/techniques, such as Java, and ActiveX, as well as server side scripts, developed using programming languages/techniques, such as JavaScript and CGI. The web pages are typically accessed using common messaging and communication protocols, such as the Hypertext Transfer Protocol (HTTP) and Transmission Control Protocol/Internet Protocol (TCP/IP).

To make a purchase via a web site, the consumer executes a generic agent, such as a "browser," e.g. Internet Explorer or Netscape Navigator, or an equivalent network aware application program that is configured to communicate with a business web site. The consumer locates a particular product by interacting with the product web pages, and then proceeds to a "check out" web page (or equivalent) to process a purchase transaction. At this point, the consumer typically enters his/her mailing address and other data sufficient to identify the consumer, render payment, and allow delivery of goods to occur, unless the consumer has previously provided the information, e.g. by registering with the business.

Consumer information, such as mailing addresses are considered valuable from the businesses' point of view because advertising and so forth use mailing addresses to send catalogues and marketing information to lure more consumers. Often times, businesses may offer services or products in exchange for, not money, but for consumer information such as mailing addresses and so forth. Because of the value associated with consumer information such as mailing addresses, many businesses, including online businesses, will often times, sell this information to other businesses.

As a result, soon after a consumer makes an online purchase from a particular online business, and has the purchase delivered to his/her mailing address, the consumer may find himself or herself receiving advertising and other catalogues from unsolicited businesses filling his/her mailbox.

Thus, what is needed is an environment that provides consumers the ability to purchase products online and have the products delivered to the consumers or designated recipients, without necessarily disclosing their mailing addresses.

BRIEF DESCRIPTION OF DRAWINGS

The present invention is illustrated by way of example and not by way of limitation in the figures of the accompanying drawings, in which the like references indicate similar elements and in which.

DETAILED DESCRIPTION OF THE INVENTION

In the following description, various aspects of the invention will be described. However, the invention may be practiced with only some or all aspects of the invention. For purposes of explanation, specific numbers, materials and configurations are set forth in order to provide a thorough understanding of the invention. However, the invention may be practiced without the specific details. In other instances, well known features are omitted or simplified in order not to obscure the invention.

Parts of the description will be presented using terms such as end-user interfaces, buttons, and so forth, commonly employed by those skilled in the art to convey the substance of their work to others skilled in the art. Parts of the description will be presented in terms of operations performed by a computing device, using terms such as submitting, requesting, selecting, confirming and so forth. As well understood by those skilled in the art, these quantities and operations take the form of electrical, magnetic, or optical signals capable of being stored, transferred, combined, and otherwise manipulated through mechanical and electrical components of a digital system. The term digital system includes general purpose as well as special purpose computing machines, systems, and the like, that are standalone, adjunct or embedded.

Various operations will be described in turn in a manner that is most helpful in understanding the invention, however, the order of description should not be construed as to imply that these operations are necessarily order dependent. Furthermore, the phrase "in one embodiment" will be used repeatedly, however the phrase does not necessarily refer to the same embodiment, although it may.

In various embodiments of the invention, a consumer is able to purchase and receive goods from web sites without revealing private delivery information, such as mailing address, to a web site/business from whom the consumer purchases goods. For the purpose of this application, the terms "purchaser" and "consumer" are synonymous.

Figure 1:
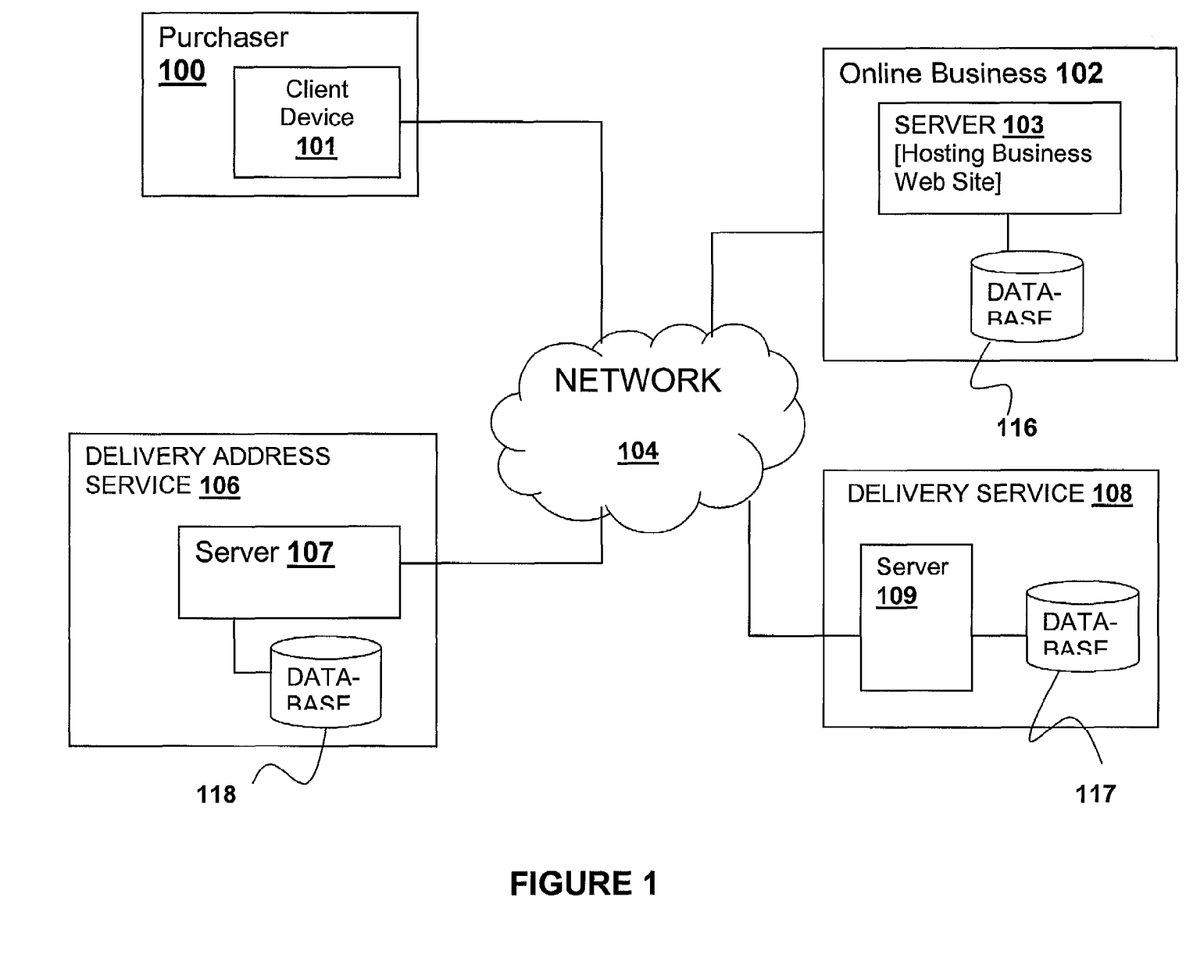
FIG. 1 illustrates a network view of the present invention for facilitating a purchaser in receiving delivery of goods purchased online, without having to reveal the purchaser's real mailing address, in accordance with one embodiment.

FIG. 1 illustrates a network view of the present invention, in accordance with one embodiment. As illustrated, an online consumer or purchaser, such as purchaser 100, is communicatively coupled to various e-commerce web sites, such as business web site of business 102 hosted by server 103, via his/her client device 101 and network 104. The business web site may e.g. be a general e-commerce retail site, an online direct sales channel of the business, or other business-to-business commerce sites. Client device 101 may comprise a computing device, such as a personal computer, which operates on behalf of user 100. In alternate embodiments, client device 101 may be a personal digital assistant (PDA), a wireless mobile telephone, or other appliance devices of like kind, instead.

For ease of understanding, it is assumed that each of the relevant business network nodes of interest to which client device 101 may communicate provide a "web site" for engaging in commercial transactions. For the present application, the phrase "web site" generally refers to a network "presence" directly maintained by a business, as well an indirect presence, totally or partially maintained by "e-commerce services" on behalf of a business.

Also shown in FIG. 1, in accordance with the present invention, a delivery address service 106 is also in communication with purchaser 100, via their respective equipment, i.e. server or servers 107 and client device 101, through network 104. Purchaser 100 is a subscriber of the delivery/mailing address privacy protection service of delivery address service 106, which advantageously protects the privacy of the "real" delivery or mailing address of user 100. For the illustrated embodiment, the privacy enhanced delivery service is offered by the delivery address service 106 in conjunction with delivery service 108. In various embodiments, the services, i.e. delivery address service 106 and delivery service 108, may be offered by the same or different business entities. While typically purchaser 100 will be charged for a fee for the privacy enhanced delivery service, however the present invention may be practiced without purchaser 100 being charged for the service. For example, the cost for providing the privacy enhanced delivery service may be borne by the e-commerce businesses 102 or alternatively by delivery service 108 to attract customers.

In one embodiment, once purchaser 100 subscribes to the privacy enhanced delivery address service offered by delivery address service 106 (in conjunction with delivery service 108), delivery address service 106 facilitates commercial transactions; in particular, delivery of purchased goods to purchaser 100, by generating substitute delivery addresses that purchaser 100 may use (in lieu of his/her own personal private mailing address), when engaging in commercial transactions with online businesses, such as business 102.

The phrase "substitute delivery addresses" refers to delivery addresses and/or associated control information that are owned and/or controlled by the delivery address service 106. The substitute delivery address (and its associated control information) are temporarily assigned to purchaser 100 to substitute for the personal and/or private mailing address of the purchaser 100, while purchaser 100 remains a service subscriber.

Also in communication with the delivery address Service' server 106 and e-commerce business' server 102, by way of network 104, is the equipment, more specifically, server 109 of a delivery service 108. Delivery service 108 may be a private delivery service such as Federal Express (FedEx®), United Parcel Service (UPS®), and so forth. Business 102 utilizes delivery service 108 to deliver goods purchased from the business to purchaser 100.

In FIG. 1, associated with business 102, delivery address service 106, and delivery service 108, more specifically, their respective servers, 103, 107 and 109, are data storages, such as databases 116–118, that can store delivery addresses for use by the delivery process of the present invention. As will be described in further detail later, in one embodiment, databases 116–118 may include tables or views that correlate delivery address information.

Figure 2:
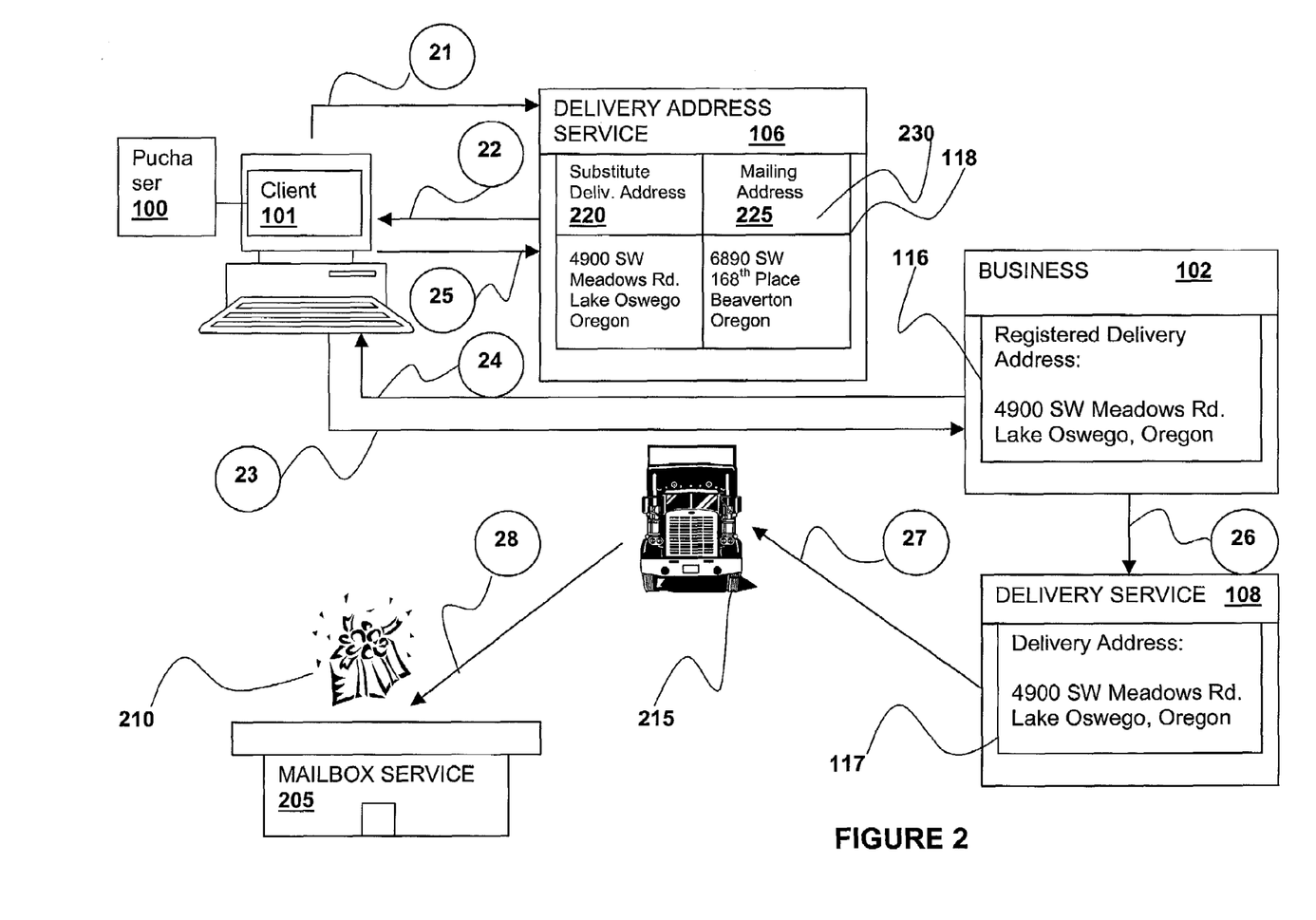
FIG. 2 illustrates the method of the present invention in further details, including the employment of pre-established mailboxes with mailbox services, in accordance with one embodiment.

FIG. 2 illustrates the method of the present invention in further details, in accordance with one embodiment. For the illustrated embodiment, delivery address service 106 pre-establishes a number of mailboxes with a mailbox service 205, such as Mailboxes Etc., the U.S. Postal Service, and so forth. The substitute delivery address 220, which delivery address service 106 provides to user 100, may be one of these pre-established mailboxes at mailbox service 205.

In FIG. 2, delivery address service 106 receives a subscription request from user 100 (operation 21). In response, the subscription request is processed by delivery address service 106, resulting in an exchange of relevant information between purchaser 100 and delivery address service 106. In particular, a mailing address 225 of purchaser 100 is provided to, and received by delivery address service 106. Typically, mailing address 225 of purchaser 100 is the address information that purchaser 100 desires to maintain private, and not wish to disclose to online businesses.

Further, a substitute delivery address 220 is provided by delivery address service 106 to purchaser 100 (operation 22) for his/her use to conduct commerce with online businesses, such as business 102. In one implementation of this embodiment, substitute delivery address 220 is advantageously selected to be proximately located to purchaser 100. In one implementation, the selection is made, based at least in part on the mailing address provided by purchaser 100.

Also illustrated in FIG. 2, is an exemplary data structure 230 suitable for use to store data associated with mailing address 225 and substitute delivery address 220 within database 118 of delivery address service 106. For the illustrated embodiment, data structure 230 is a table or view including a number of columns for storing various information associated with purchaser 100, such as, but not limited to the substitute delivery address 220 assigned to the mailing address 225 in order to correlate the two addresses. Table/view 230 is illustrated as a single table/view for ease of understanding. In alternate embodiments, multiple tables/views or other data structures may be employed for storing the various data regarding delivery address and associated information of users 100.

In FIG. 2, once the purchaser 100 receives substitute delivery address 220, purchaser 100 may shop online with e.g. business 102, using the assigned substitute delivery address 220 (operation 23). Purchaser 100 may provide substitute delivery address 220 to business 102 during registration, if registration is required, or in the alternative, during the "check out" process. Optionally, purchaser 100 may request, and delivery address service 106 may assign more than one substitute delivery address 220 for use by purchaser 100, as purchaser 100 may desire to register/use different delivery addresses with different online businesses.

Shown also in FIG. 2, is business 102 storing in its database 116 delivery address 220 of purchaser 100. Note that, business 102 in general, does not have possession of mailing address 225 of purchaser 100. As alluded to earlier, substitute delivery addresses 220, in general, are assigned for use by purchaser 100 for a temporal duration, while purchaser 100 remains a subscriber of the services offered by delivery address service 106.

In one embodiment, the assignment of a substitute delivery address 220 may also include the assignment of a substitute email address (not shown) for purchaser 100. The substitute email address may designate an email address of delivery address service 106 as the recipient of any electronic communication, and further protect the email address of purchaser 100. The association between the assigned substitute email address and the user's actual email address may in like manner be stored in the earlier described table/view data structure 230. Accordingly, electronic communication such as order confirmation and so forth, between business 102 and purchaser 100 may also be facilitated by delivery address service 106 without revealing the email address of purchaser 100.

Once purchaser 100 purchases goods 210 for delivery, in the embodiment shown in FIG. 2, the purchaser 100 receives a confirmation of the purchase from business 102 (operation 24). The confirmation may include information such as, but not limited to, identity of business 102, quantity, description, and method of delivery for purchased goods 210, in particular, the delivery service utilized by business 102.

As alluded to earlier, the confirmation may be received by purchaser 100 directly, or by way of the substitute email address of delivery address service 106. In the former embodiment, the confirmation information is also relayed to delivery address service 106 by purchaser 100 (operation 25). Alternatively, for the later embodiment, delivery address service 106 may retain a copy of the relevant information before forwarding the confirmation information to purchaser 100.

Thereafter, delivery address service 106 awaits notification, from mailbox service 205, that purchased goods 210 have arrived at the substitute delivery address 220 at mailbox service 205. In the meantime, online business 102 communicates the delivery information to delivery service 108 (operation 26). As discussed above, delivery service 108 may be any type of delivery service, for example, UPS. This delivery information, including substitute delivery address 220 may be stored in database 117 of delivery service 108. In response, delivery service 108 proceeds to deliver purchased goods 210 to purchaser 100 at substitute delivery address 220 via a means of transportation, such as delivery truck 215 (operation 27).

Upon delivery of the purchased goods 210 by delivery truck 215 to the assigned substitute mailing address (i.e. a mailbox) 220 within mailbox service 205, mailbox service 205 informs delivery address service 106 of the arrival of the goods at mailbox service 205. In turn, for the illustrated embodiment, delivery address service 106 notifies purchaser 100 that the purchased goods 210 have arrived at subscription address 220 within mailbox service 205, and are ready for pick-up.

In alternate embodiments, mailbox service 205 may notify purchaser 100 directly (on behalf of delivery address service 106). Preferably, mailbox service 205 notifies delivery address service 106 of the arrival as well as of the pick up by purchaser 100.

In FIG. 2, for ease of understanding, the means of transportation shown is a delivery truck; however, in practice, the means of transportation may include other transportation means such as, but not limited to, air transport. Additionally, beside the conventional TCP/IP based Internet, all or part of the communications between purchaser 100, delivery address service 106, business 102, and delivery service 108 facilitated through network 104 may be facilitated over conventional and/or wireless telephony.

As a result, a purchaser or consumer 100 may purchase goods online from a business web site, and receive the purchased goods without disclosing the user's address to the business. While on the surface, a purchaser or consumer may on its own arrange for such mailbox on his or her own for e-commerce transaction to shield his or her real mailing address, however, the pre-arrangement and subsequent automatic assignment to purchaser subscribers by delivery address service 106 offers the advantage of eliminating the need of the purchaser subscribers from having to make the arrangement on their own. Moreover, by pre-arranging for the mailboxes in bulk, it is expected that delivery address service 106 will be able to make available such mailbox services to purchaser 100 at a cost that is more economical than purchaser 100 can achiever on his/her own. Further, as earlier described, in one implementation, delivery address service 106 selects a mailbox that is proximately located to purchaser 100 for assignment, based at least in part on the mailing address of purchaser 100. Such proximate assignment also alleviates purchaser 100 the burden from having to research for the "most" convenient mailbox location. Additionally, the present invention provides for automatic notification of the arrival of the purchased goods, a service otherwise not available if purchaser 100 has arranged for the mailbox service on his/her own.

Before proceeding to describe another embodiment of the present invention, it should also be noted that while for ease of understanding, the present invention, in particular, the embodiment of FIG. 2, has been described with the purchased goods being delivered to the purchaser, the present invention is not so limited. The present invention may also be practiced to protect the privacy of the mailing address of any recipient designated by purchaser 100. For example, if purchaser 100 is purchasing the good for another party who is also a subscriber of delivery address service 106, purchaser may provide the substitute delivery address assigned by delivery address service 106 to the recipient, when "checking out" the purchased goods, and specifying the identity and address of the receiving party.

Figure 3:
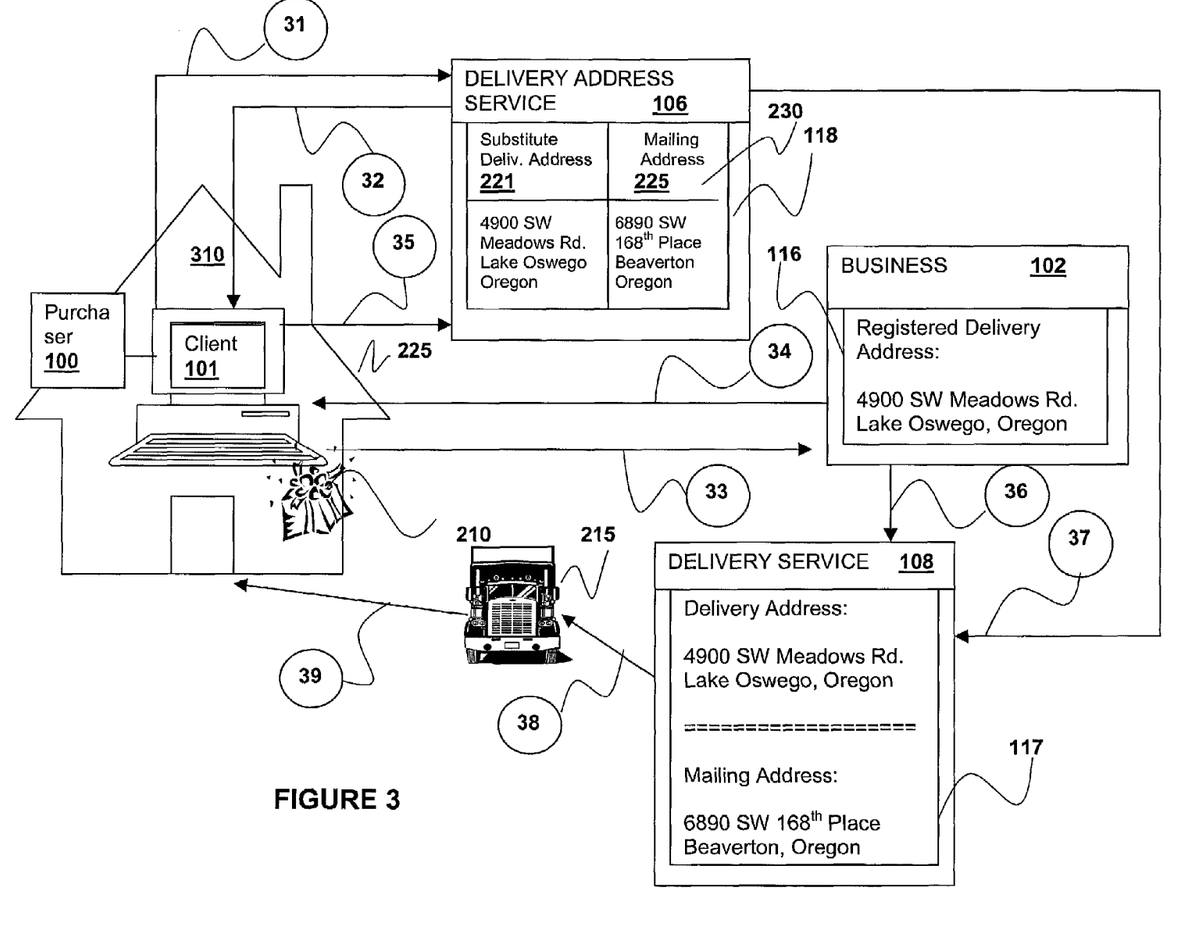
FIG. 3 illustrates an alternate embodiment of the present invention in further details, including the employment of virtual delivery addresses.

FIG. 3 illustrates an alternate embodiment of the method of the present invention. The embodiment is similar to the earlier described embodiment of FIG. 2, but differs in that virtual delivery addresses are employed, in lieu of the pre-established mailboxes of FIG. 2. Each virtual delivery address is a fictitious delivery address, however it either contains a particular identifier (e.g. a special 9-digit zip identifiable as the zip of delivery address service 106) or laid out in a particular format (e.g. containing a "c/o" line naming delivery address service 106), allowing delivery service 108 to recognize that the goods to be delivered is associated with a subscriber of delivery address service 106. The embodiment is particularly suitable for e-commerce transaction with online businesses where the purchaser may select the delivery service, e.g. between U.S. Postal Service, versus Federal Express or United Parcel Service and so forth.

As with the embodiment of FIG. 2, delivery address service 106 receives a subscription request from user 100 (operation 31). In response, the subscription request is processed by delivery address service 106, resulting in an exchange of relevant information between user 100 and delivery address service 106. As before, a mailing address 225 of user 100 is provided to, and received by delivery address service 106. Again, typically, mailing address 225 of user 100 is the address information that purchaser 100 desires to maintain private, and not wish to disclose to online businesses. Further, a virtual (fictitious) delivery address is provided by delivery address service 106 to purchaser 100 (operation 32) for his/her use as substitute delivery address 221 to conduct commerce with online businesses, such as business 102.

Similar to the embodiment of FIG. 2, exemplary data structure 230 is used to store data associated with mailing address 225 and substitute delivery address 221 within database 118 of delivery address service 106. Data structure 230 includes a table or view having a number of columns for storing various information associated with purchaser 100, such as, but not limited to the substitute delivery address 221 assigned to the mailing address 225 in order to correlate the two addresses. As before, table/view 230 is illustrated as a single table/view for ease of understanding. In alternate embodiments, multiple tables/views or other data structures may be employed for storing the various data regarding delivery address and associated information of purchasers 100.

As in FIG. 2, once purchaser 100 receives substitute delivery address 220, purchaser 100 may engage in online purchasing, e.g. with business 102, using the assigned substitute delivery address 221 (operation 33). Purchaser 100 may provide substitute delivery address 220 to business 102 during a registration process with business 102 or during "check out" time. Again, purchaser 100 may request, and delivery address service 106 may assign more than one substitute delivery address 221 for use by purchaser 100, as purchaser 100 may desire to register/use different delivery addresses with different online businesses.

As in FIG. 2, business 102 stores in its database 116, delivery address 221 of purchaser 100. Again, business 102 in general, does not have possession of mailing address 225 of purchaser 100. As alluded to earlier, substitute delivery addresses 221, in general, are assigned for use by purchaser 100 for a temporal duration, while purchaser 100 remains a subscriber of the services offered by delivery address service 106. Note that in alternate variations of the present embodiment, if desired, one substitute mailing address 221 (formed using a virtual (fictitious) delivery address) may also be assigned for use by purchaser 100 for each transaction or purchase made by purchaser 100.

As before, the assignment of a substitute delivery address 221 may also include the assignment of a substitute email address (not shown) for purchaser 100. The substitute email address may designate an email address of delivery address service 106 as the recipient of any electronic communication, and further protect the email address of purchaser 100. The association between the assigned substitute email address and the user's actual email address may in like manner be stored in the earlier described table/view data structure 230. Accordingly, electronic communication such as order confirmation and so forth, between business 102 and purchaser 100 may also be facilitated by delivery address service 106 without revealing the email address of purchaser 100.

Once purchaser 100 purchases goods 210 for delivery, as with the embodiment of FIG. 2, purchaser 100 receives a confirmation of the purchase from business 102 (operation 34). The confirmation may include information such as, but not limited to, identity of business 102, quantity, description, and method of delivery for purchased goods 210, in particular, the delivery service utilized by business 102.

As alluded to earlier, the confirmation may be received by purchaser 100 directly, or by way of the substitute email address of delivery address service 106. In the former embodiment, the confirmation information is also relayed to delivery address service 106 by purchaser 100 (operation 35). Alternatively, for the later embodiment, delivery address service 106 may retain a copy of the relevant information before forwarding the confirmation information to purchaser 100.

Thereafter, delivery address service 106 awaits notification. However, for this embodiment, delivery address service 106 awaits notification from delivery service 108 of the fact that it has been requested by online business 102 to deliver purchased goods 210. In the meantime, as before, online business 102 communicates the delivery information to delivery service 108 (operation 36). Again, this delivery information, including substitute delivery address 221 may be stored in database 117 of delivery service 108. In response, upon recognition of the special nature of the delivery address, i.e. the delivery address being a virtual delivery address of delivery address service 106, delivery service 108, instead of proceeding with the delivery of the purchased goods 210, notifies delivery address service 106 instead (operation 37). In response, delivery address service 106 provides delivery service 108 with the real delivery or mailing address of purchaser 100.

In one embodiment, the exchange includes delivery service 108 providing delivery address service 106 with the identification of purchaser 100, allowing delivery address service 106 to look up, and provides in return the real delivery/mailing address of purchaser 100. Upon having been provided with the real delivery/mailing address of purchaser 100, delivery service 108 proceeds to deliver the purchased goods to purchaser 100, e.g. by way of transportation means 215 (operations 38–39).

Accordingly, as with the earlier embodiment, a purchaser or consumer 100 may purchase goods online from a business web site, and receive the purchased goods without disclosing the purchaser's address to the business. As before, this embodiment of the present invention may also be practiced to protect the privacy of the mailing address of a designated recipient of the purchased goods, who also happens to be a subscriber of delivery address service 106, and his/her substitute delivery address 221 is known to purchaser 100. The purchaser 100 may e.g. provide the recipient's substitute delivery address 221 at "check out" time instead, which in due course will be provided to delivery service 108, and employed to obtain the real delivery or mailing address of purchaser 100.

Figure 4:
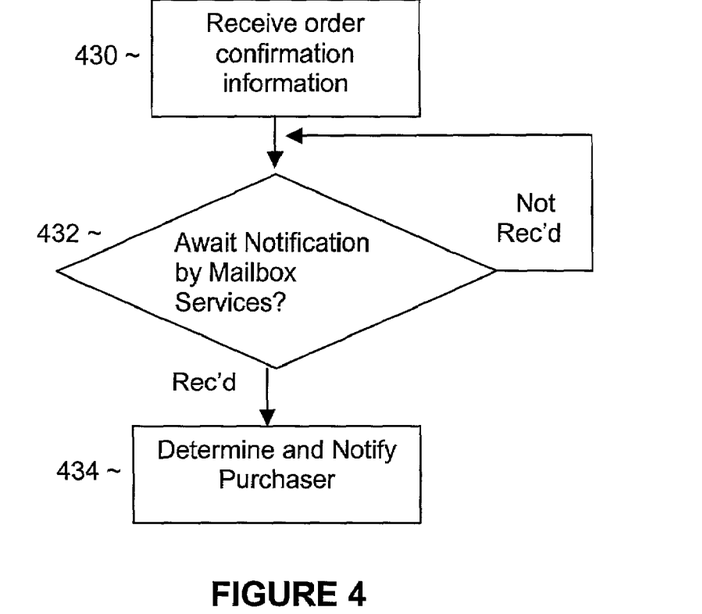
FIG. 4 illustrates the operational flow of the relevant aspects of the delivery address service for facilitating delivery of online purchased goods to the purchaser or a designated recipient of the purchaser, under the embodiment of FIG. 2.
Figure 5:
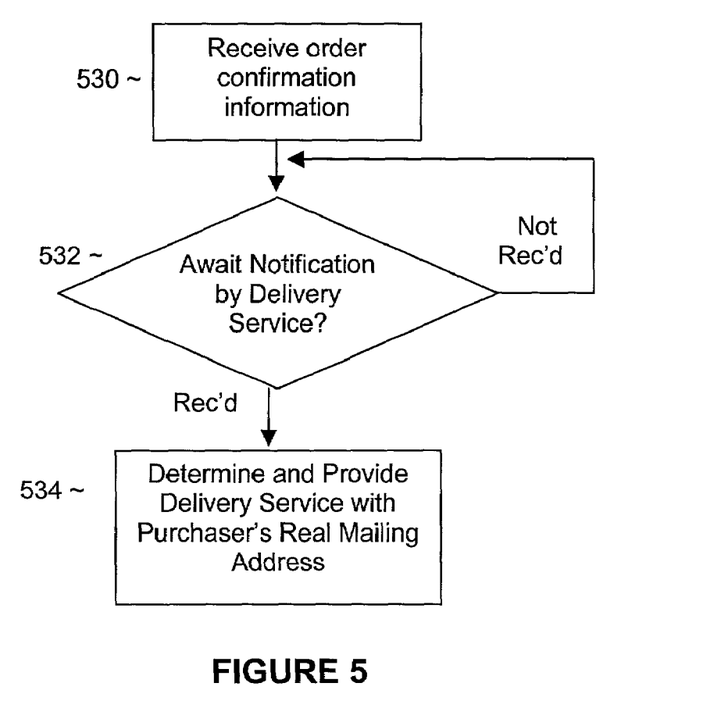
FIG. 5 illustrates the operational flow of the relevant aspects of the delivery address service for facilitating delivery of online purchased goods to a purchaser or a designated recipient of the purchaser, under the embodiment of FIG. 3.

Referring now to FIGS. 4 and 5, wherein two flow charts illustrating the relevant aspects of delivery address service 106 in support of the embodiments of FIGS. 2 and 3, in accordance with one embodiment each, are shown, respectively. As illustrated in FIG. 4, upon receipt of the order confirmation information (either from purchaser 100 or online business 102), block 430, delivery address service 106 awaits notification from the mailbox service "hosting" the mailbox of substitute delivery address 220 (with respect to the arrival of purchased goods 210), block 432, in support of the embodiment of FIG. 2. As shown, eventually, delivery address service 106 is notified of the arrival of purchased goods 210. In response, delivery address service 106 determines the identity of purchaser 100, notifies purchaser 100 of the arrival accordingly, block 434.

As for the embodiment of FIG. 5, upon receipt of the order confirmation information (either from purchaser 100 or online business 102), block 530, delivery address service 106 awaits notification from delivery service 108 with respect to its receipt of a request by business 102 to deliver purchased goods 210, block 532, in support of the embodiment of FIG. 3. As shown, eventually, delivery address service 106 is notified of the request to deliver purchased goods 210. In response, delivery address service 106 determines the identity and the mailing address of purchaser 100, and provides the information to delivery service 108, block 534.

Figure 6:
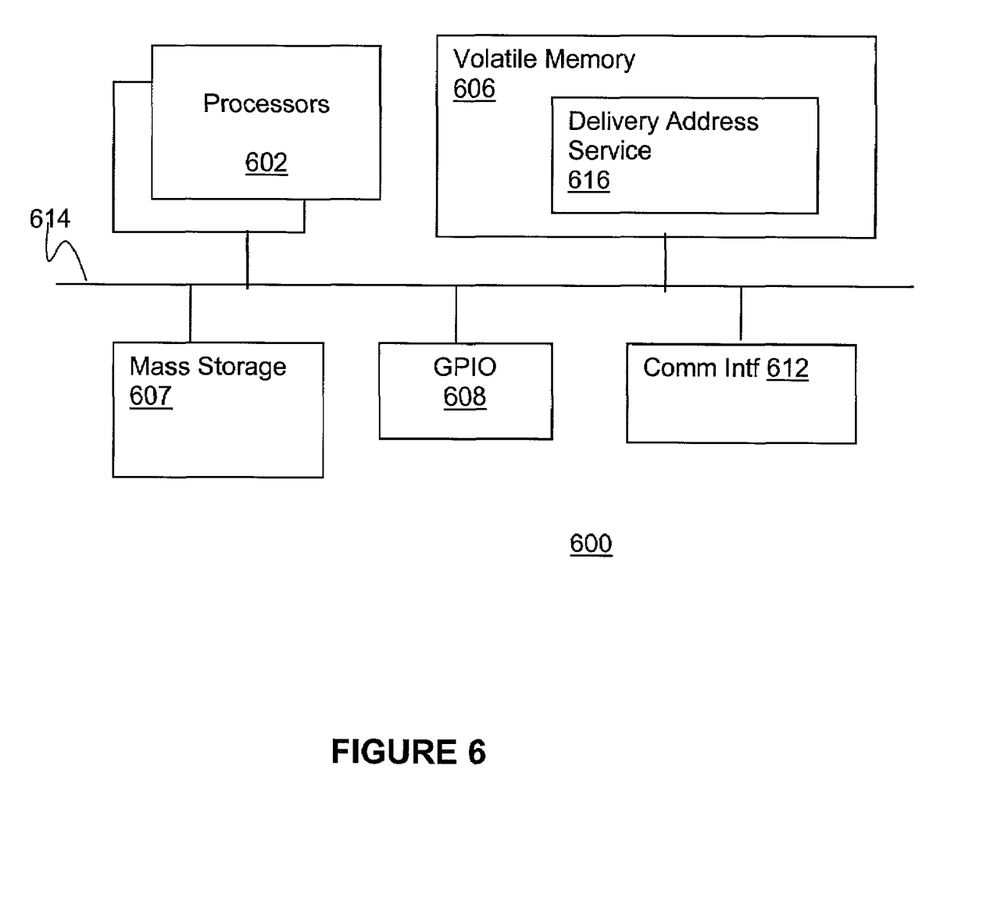
FIG. 6 illustrates an example server suitable for use to practice the delivery address service of the present invention, in accordance with one embodiment.

FIG. 6 illustrates an example server suitable for use to delivery address service 106 of FIG. 1, in accordance with one embodiment. As shown, server 600 includes one or more processors 602 and system memory 606. Additionally, server 600 includes mass storage devices 607 (such as diskette, hard drive, CDROM and so forth), GPIO 608 (for interfacing with I/O devices such as keyboard, cursor control and so forth) and communication interfaces 612 (such as network interface cards, modems and so forth). The elements are coupled to each other via system bus 614, which represents one or more buses. In the case of multiple buses, they are bridged by one or more bus bridges (not shown). Each of these elements performs its conventional functions. In particular, system memory 604 and mass storage 606 are employed to store a working copy and a permanent copy of the programming instructions implementing delivery address service 106.

Accordingly, methods and apparatuses for protecting the privacy of the mailing addresses of online purchasers of goods have been described. While the present invention has been described in terms of the above-illustrated embodiments, the invention is not limited to the embodiments described. The present invention can be practiced with modification and alteration within the spirit and scope of the appended claims. Thus, the description is to be regarded as illustrative instead of restrictive on the present invention.

What is claimed is:

1. In an electronic delivery address service, a method comprising:

receiving by the delivery address service via electronic communication, an electronic subscription from a subscriber, the received subscription including a mailing address of the subscriber;

in response, the delivery address service electronically generating a substitute delivery address;

transmitting by the delivery address service via electronic communication the substitute delivery address to the subscriber, for the subscriber to use in an online purchase of a good;

receiving by the delivery address service via electronic communication, an electronic notification of either a request to deliver or an arrival of the purchased good, as a result of the substitute delivery address being used by the subscriber in the online purchase of the good; and intervening by the delivery address service by electronically accessing and communicating the mailing address provided by the subscriber as part of said electronic subscription to a delivery service to facilitate delivery of the purchased good to the subscriber at the mailing address of the subscriber, wherein said mailing address accessed and communicated by said delivery address service is retrieved from a database of said delivery address service.

2. The method of claim 1, wherein the method further comprises the delivery address service correlating the substitute delivery address to the mailing address of the subscriber.

3. The method of claim 1, wherein the substitute delivery address comprises one of a plurality of mailboxes pre-established with a mailbox service by the delivery address service.

4. The method of claim 3, wherein the method further comprises the delivery address service selecting a mailbox proximately located with the mailing address of the subscriber, for use as the substitute delivery address.

5. The method of claim 3, wherein said receiving by the delivery address service of a notification comprises receiving by the delivery address service a notification from a mailbox service with respect to the arrival of the purchased goods.

6. The method of claim 5, wherein said intervening by the delivery address service comprises said delivery address service notifying said subscriber of the arrival of the purchased goods.

7. The method of claim 1, wherein the substitute delivery address comprises one of a plurality of virtual delivery address artificially created by the delivery address service.

8. The method of claim 7, wherein said receiving of a notification comprises receiving a notification of a request to deliver the purchased good from the delivery service, and the method further comprises providing the mailing address of the subscriber to the delivery service.

9. The method of claim 8, wherein said intervening by the delivery address service comprises the delivery address service automatically providing said mailing address of the subscriber to the delivery service.

10. The method of claim 1, wherein the method further comprises receiving a confirmation by the delivery address service of the purchase.

11. The method of claim 10, wherein the delivery address service receives the confirmation from the subscriber.

12. The method of claim 10, wherein the delivery address service receives the confirmation from an online business from which the goods to be delivered was purchased.

13. The method of claim 1, wherein the subscriber is a purchaser of the goods.

14. The method of claim 1, wherein the subscriber is a beneficiary of the purchase.

15. A storage medium having stored therein a plurality of instructions that are machine executable, wherein when executed, said executing instructions operate to enable an address delivery service to receive a delivery address service subscription from a subscriber, including a mailing address of the subscriber, to generate a substitute delivery address, to transmit the substitute address to the subscriber, to receive an electronic notification of a request to deliver or arrival of purchased goods for the subscriber, resulting from the substitute delivery address being used by the subscriber, in an online purchase, and to intervene by the delivery address service by electronically accessing and communicating the mailing address provided by the subscriber as part of said subscription to a delivery service to facilitate delivery of the purchased goods to the subscriber at the mailing address of the subscriber, wherein said mailing address accessed and communicated by said delivery address service is retrieved from a database of said delivery address service.

16. The storage medium of claim 15, wherein said executing instructions further operate to correlate the subscription delivery address with the mailing address of the user.

17. The storage medium of claim 15, wherein said executing instructions further enable the delivery address service to provide one of a plurality of pre-established mailboxes as the substitute delivery address.

18. The storage medium of claim 17, wherein said executing instructions further enable the delivery address service to receive a notification of the arrival of the purchased goods from a mailbox service, and to notify the subscriber of the arrival.

19. The storage medium of claim 15, wherein said executing instructions further enable the delivery address service to provide one of a plurality of virtual delivery addresses as the substitute delivery address.

20. The storage medium of claim 19, wherein said executing instructions further enable the delivery address service to receive a notification of a request to deliver the purchased goods from a delivery service, and to provide the mailing address of the subscriber to the delivery service.

21. The storage medium of claim 15, wherein said executing instructions further enable the delivery address service to receive a confirmation of the online purchase.

22. An apparatus comprising:
a storage medium having stored therein a plurality of instructions that are machine executable, wherein when executed, said executing instructions operate to enable the apparatus to receive a delivery address service subscription from a subscriber, including a mailing address of the subscriber, to generate a substitute delivery address, to transmit the substitute delivery address to the subscriber, to receive an electronic notification of a request to deliver or arrival of purchased goods of the subscriber, resulting from the substitute delivery address being used by the subscriber in an online purchase, and to intervene by the delivery address service by electronically accessing and communicating the mailing address provided by the subscriber as part of said subscription to a delivery service to facilitate delivery of the purchased goods to the subscriber at the mailing address of the subscriber, wherein said mailing address accessed and communicated by said delivery address service is retrieved from a database of said delivery address service; and
a processor coupled to said storage medium to execute said instructions.

23. The apparatus of claim 22, wherein said executing instructions further operate to correlate the subscription delivery address with the mailing address of the user.

24. The apparatus of claim 22, wherein said executing instructions further enable the delivery address service to provide one of a plurality of pre-established mailboxes as the substitute delivery address.

25. The apparatus of claim 24, wherein said executing instructions further enable the delivery address service to receive a notification of the arrival of the purchased goods from a mailbox service, and to notify the subscriber of the arrival.

26. The apparatus of claim 22, wherein said executing instructions further enable the delivery address service to provide one of a plurality of virtual delivery addresses as the substitute delivery address.

27. The apparatus of claim 26, wherein said executing instructions further enable the delivery address service to receive a notification of a request to deliver the purchased goods from a delivery service, and to provide the mailing address of the subscriber to the delivery service.

28. The apparatus of claim 22, wherein said executing instructions further enable the delivery address service to receive a confirmation of the online purchase.

* * * * *